C. P. HIGGINS.
Bale-Tying Machine.
No. 218,741.  Patented Aug. 19, 1879.
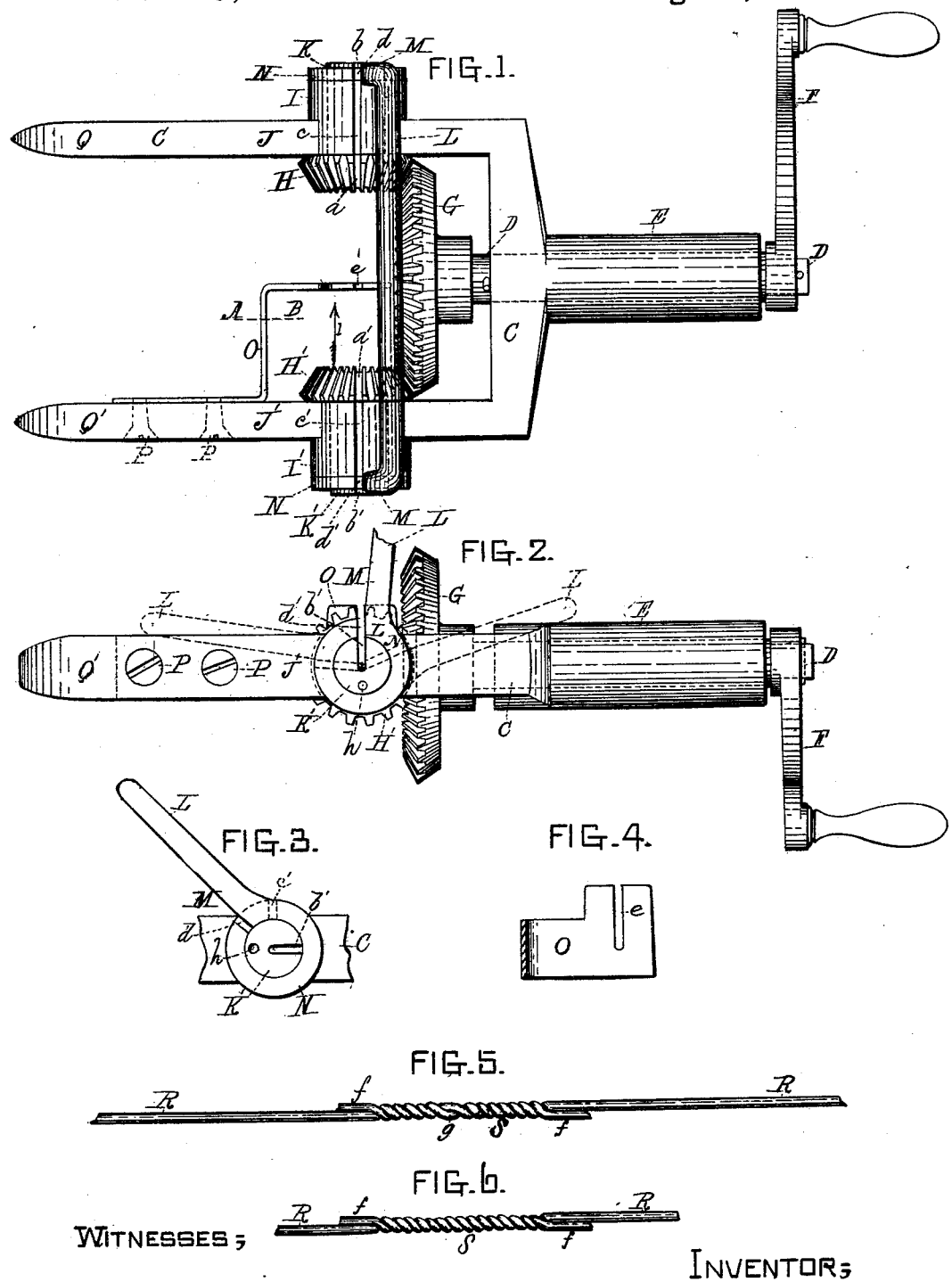
WITNESSES:
INVENTOR:
Campbell P. Higgins

UNITED STATES PATENT OFFICE.

CAMPBELL P. HIGGINS, OF EAST LINE, NEW YORK, ASSIGNOR, BY MESNE ASSIGNMENT, TO WASHBURN & MOEN MANUFACTURING COMPANY, OF WORCESTER, MASSACHUSETTS.

IMPROVEMENT IN BALE-TYING MACHINES.

Specification forming part of Letters Patent No. 218,741, dated August 19, 1879; application filed April 1, 1878.

*To all whom it may concern:*

Be it known that I, CAMPBELL P. HIGGINS, of East Line, in the county of Saratoga and State of New York, have invented certain new and useful Improvements in Bale-Tying Machines; and I do hereby declare that the following is a full, clear, and exact description of the same, reference being had to the accompanying drawings, forming a part of this specification, and in which—

Figure 1 represents a top or plan view of the machine. Fig. 2 represents an end view, as will be hereinafter more fully described; and Figs. 3 and 4 represent portions of the machine which will be hereinafter more fully described; and Figs. 5 and 6 represent the ends of bale-wires, as the same can be locked or twisted together by my said machine, as will be hereinafter more fully described.

To enable those skilled in the art to which my invention belongs to make and use the same, I will proceed to describe it more in detail.

In the drawings, the part marked C represents the frame of the machine, which may be made from any suitable material, cast metal being preferred as being more convenient in many respects in the manufacture.

The driving-shaft D is fitted to turn in a pipe-bearing piece, E, and is fitted with a crank, F, on its outer end, by means of which the bevel-gear G, secured to its inner end, is rotated, thereby giving motion to bevel-gears H H', the journals of which are fitted to turn in pipe-bearings I I', projecting from the side frame-pieces, J J', of the frame C. Bevel-gears H H' are provided with slots $a$ $a'$, said slots extending to or below their centers, while their journals K K' are provided with corresponding slots $b$ $b'$, and the pipe-bearings I I' are provided with corresponding slots $c$ $c'$.

The part marked L is a loop or handle, the ends of which are made to fit and turn upon the ends of journals K K' of the slotted gears H H', as fully indicated in the drawings, and said loop or handle L can be swung back and forth upon the journals K K' as desired, its extreme motion in either direction being indicated by dotted lines, Fig. 2.

As before indicated, the bail or handle L is provided with bent ends M M, and enlarged to form bearings N N, which encircle the journals K K' of the slotted gears H H', as indicated in Figs. 1, 2, and 3 of the drawings. The bearings N N of the bail or handle L are provided with slots $d$ $d'$, corresponding with the slots in the gears H H' and the slots in the pipe-bearings I I' and journals K K'.

The part marked O is a thin detachable slotted piece, held in position by screws or bolts P P passing through the side piece J'; and Fig. 4 of the drawings represents a view on line A B, Fig. 1, looking in the direction of the arrow, same figure, and its slot $e$ is arranged in the same vertical plane with the slots $c$ $c'$ in the pipe-bearings I I'.

The ends Q Q' of the parts J J' are pointed, so that they can be easily thrust into the bale, to aid in supporting and steadying the machine during the operation of twisting the bale-tie ends, and thereby locking the bale-wire about the bale.

The arrangement of the pointed ends Q Q' is such that when forced into the bale of hay the slots for the wire are not obstructed, and the wire can be inserted and removed from the slots when the pointed ends are in the hay.

The operation is as follows: The bale having been suitably compressed, the bale-wire is put around the bale while in the press, and its ends lapped and placed in the slots $a$ $a'$, and $c$ $c'$, and $b$ $b'$, the single strand of the bale-wire R R passing down through the slots $d$ $d'$ in the bearings N N; after which the bail or loop L is turned either forward or back, so as to throw the slots $d$ $d'$ out of line with the slots $c$ $c'$ in the pipe-bearings I I'; after which the operator, by means of a crank, F, or equivalent device, rotates shaft D and its gear G, thereby turning or rotating slotted bevel-gear H in one direction and slotted bevel-gear H' in an opposite direction, and by which operation, if the lapped ends $f$ are allowed to rest in slot $e$ midway between the slotted gears H H', a twist or lock will be formed between the ends $f$ of the bale-wire R, as indicated in Fig. 5 of the drawings, while if the slotted piece O is not used, but is removed, the ends ƒ ƒ of the bale-wire R will be intertwisted or locked together, as indicated in Fig. 6 of the drawings, the only difference being that the intertwist or lock S will be interrupted slightly, as indicated at $g$, Fig. 5 of the drawings. After the twist or lock S is formed, bevel-gear G is turned to bring the slots $a$ $a'$ in gears H H' in line with the slots $c$ $c'$, and bail L is also turned to bring the slots $d$ $d'$ in line with the other slots, when the wire can be detached from the slots in the machine, and the baling operation proceeds by the securing of another bale-wire, R, about the bale in the same manner as that above described, and so on.

It will be observed that the bearings N N prevent the wire from slipping out of the slots during the operation of forming twist or lock S.

In placing the lapped ends in the machine they are run in from opposite sides, and pass each other a sufficient distance to secure the ends against liability of being pulled out of their respective slotted gears before the lock or twist S is completed.

If preferred in any case, the ends ƒ may be run into holes $h$ in the slotted gears and their journals. In this latter case the end of the wire which was run through the slots $b$ and $a$ would be run into the hole $h$ in the slotted gear H', instead of being run into the slot $a'$, while the end of the wire which was run through the slots $b'$ and $a'$ would be run into the hole $h$ in the gear H, instead of into the slots $a$ and $b$.

The slotted guide-piece O may be used or not, as preferred.

It will be seen from the foregoing description that my bale-tie machine is a very convenient and compact apparatus, and can be used for tying bale-wires in a very perfect and secure manner.

Having described my bale-tying machine, what I claim therein as new and of my invention, and desire to secure by Letters Patent, is—

1. In a bale-tying machine, the combination, with a supporting-frame, C, of the slotted pinions or gears H H', revolving in opposite directions, for the purposes set forth.

2. In a bale-tying machine, the combination, with the revolving slotted gears for twisting lapped wire, of mechanism or devices to prevent the wire from twisting out of such slots.

3. The combination, with the revolving slotted gears H H', of bearings N N, provided with slots, for the purposes stated.

4. The combination, with a bale-tying machine, of a swinging bail-handle, L, provided with bearings N N, for the purposes stated, whereby the attendant or operator can at the same time support the machine and close the wire-slots.

5. The combination, with the ends of the journals K K', of the slotted gears H H' and bail-handle L, provided with slotted bearings N N.

6. In a bale-tying machine, the combination, with the slotted gears for twisting the lapped ends of the wire, of an adjustable device for completely closing and unclosing the slots for the wire.

CAMPBELL P. HIGGINS.

Witnesses:
GEORGE HIGGINS,
JOHN BROWN.